United States Patent
Zhao et al.

(10) Patent No.: US 11,590,972 B2
(45) Date of Patent: Feb. 28, 2023

(54) VEHICLE LAUNCH FROM STANDSTILL UNDER ADAPTIVE CRUISE CONROL

(71) Applicant: GM GLOBAL TECHNOLOGY OPERATIONS LLC, Detroit, MI (US)

(72) Inventors: Ming Zhao, Northville, MI (US); Mark A. Schang, Milford, MI (US); Sung-Tu Ho, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 181 days.

(21) Appl. No.: 16/912,221

(22) Filed: Jun. 25, 2020

(65) Prior Publication Data
US 2021/0402993 A1 Dec. 30, 2021

(51) Int. Cl.
*B60W 30/14* (2006.01)
*B60W 30/18* (2012.01)
*B60W 40/08* (2012.01)

(52) U.S. Cl.
CPC ...... *B60W 30/14* (2013.01); *B60W 30/18027* (2013.01); *B60W 40/08* (2013.01); *B60W 2540/229* (2020.02)

(58) Field of Classification Search
CPC ........... B60W 30/14; B60W 30/18027; B60W 40/08; B60W 2540/229; B60W 2420/42; B60W 50/14; B60W 2040/0818; B60W 2050/0025; B60W 2540/225; B60W 30/17; B60K 2370/161
USPC .......................................................... 701/70
See application file for complete search history.

(56) References Cited

U.S. PATENT DOCUMENTS

| | | | | |
|---|---|---|---|---|
| 6,438,491 | B1* | 8/2002 | Farmer | G01S 13/931 340/436 |
| 8,788,176 | B1* | 7/2014 | Yopp | B60W 30/10 701/96 |
| 2004/0078125 | A1* | 4/2004 | Woodard | G07C 5/008 701/29.3 |
| 2004/0209594 | A1* | 10/2004 | Naboulsi | H04M 1/6083 455/403 |
| 2008/0236275 | A1* | 10/2008 | Breed | G01S 15/87 73/290 V |
| 2008/0292146 | A1* | 11/2008 | Breed | B60N 2/002 382/118 |
| 2011/0169625 | A1* | 7/2011 | James | B60W 30/095 340/439 |
| 2012/0239266 | A1* | 9/2012 | Kato | B60T 7/22 701/70 |

(Continued)

*Primary Examiner* — B M M Hannan
(74) *Attorney, Agent, or Firm* — Lorenz & Kopf LLP

(57) ABSTRACT

In accordance with an exemplary embodiment, a vehicle is provided that includes a body, a drive system, and a control system for controlling the adaptive cruise control functionality for the vehicle. The drive system is disposed within the body, and has adaptive cruise control functionality. The control system includes: one or more sensors disposed onboard the vehicle and configured to obtain sensor data for monitoring a driver of the vehicle while the vehicle is stopped during adaptive cruise control operation while a target vehicle in front of the vehicle has stopped; and a processor coupled to the one or more sensors and configured to provide instructions for automatically resuming movement of the vehicle, when the target vehicle resumes movement, based on the monitoring of the driver of the vehicle.

9 Claims, 4 Drawing Sheets

(56) References Cited

U.S. PATENT DOCUMENTS

| | | | |
|---|---|---|---|
| 2014/0249722 A1* | 9/2014 | Hegeman | G08G 1/167 701/1 |
| 2015/0025731 A1* | 1/2015 | Uehara | B60W 50/14 701/23 |
| 2015/0258996 A1* | 9/2015 | Victor | G09B 9/04 340/576 |
| 2016/0001781 A1* | 1/2016 | Fung | G16H 50/20 701/36 |
| 2017/0305349 A1* | 10/2017 | Naboulsi | B60R 1/025 |
| 2017/0313313 A1* | 11/2017 | Asakura | B60W 30/12 |
| 2018/0037230 A1* | 2/2018 | Otake | B60W 10/06 |
| 2019/0248374 A1* | 8/2019 | Aizawa | B60K 28/06 |
| 2020/0207371 A1* | 7/2020 | Dougherty | B60W 60/00186 |
| 2020/0242856 A1* | 7/2020 | Schmitt | G07C 5/008 |
| 2020/0307632 A1* | 10/2020 | Tsuji | B60W 30/181 |
| 2021/0171030 A1* | 6/2021 | Lee | H04W 4/40 |
| 2021/0171038 A1* | 6/2021 | Lee | H04W 4/023 |

\* cited by examiner

VEHICLE LAUNCH FROM STANDSTILL UNDER ADAPTIVE CRUISE CONROL

INTRODUCTION

The technical field generally relates to the field of vehicles and, more specifically, to control of adaptive cruise control features for vehicles.

Many vehicles today include adaptive cruise control functionality. With adaptive cruise control, a host vehicle may follow a target vehicle in front of the host vehicle. With certain types of adaptive cruise control, such as full speed range adaptive cruise control, the host vehicle may also stop when the target vehicle stops, and subsequently resume movement when the target vehicle resumes movement. However, in certain embodiments, additional considerations may also be desired with respect to resuming movement of the host vehicle.

Accordingly, it is desirable to provide systems and methods for controlling an adaptive cruise control system of a vehicle, such as control of a full speed range adaptive cruise control system with respect to stopping and resuming movement after a target vehicle has stopped and resumed movement. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method for controlling adaptive cruise control functionality for a vehicle is provided, that includes: monitoring a driver of the vehicle while the vehicle is stopped during adaptive cruise control operation while a target vehicle in front of the vehicle has stopped, using sensor data obtained by one or more sensors onboard the vehicle; and automatically resuming movement of the vehicle, via instructions provided by a processor, when the target vehicle resumes movement, based on the monitoring of the driver of the vehicle.

Also in an exemplary embodiment, the method further includes the step of calculating, via the processor, a driver attentiveness score based on the monitoring of the driver while the vehicle is stopped during adaptive cruise control operation while the target vehicle in front of the vehicle has stopped; wherein the step of automatically resuming movement of the vehicle includes automatically resuming movement of the vehicle, via instructions provided by the processor, when the target vehicle resumes movement, based on the calculated driver attentiveness score.

Also in an exemplary embodiment, the driver attentiveness score is calculated via the processor along a sliding window including a plurality of points in time while the vehicle is stopped until the target vehicle resumes movement; and the driver attentiveness score is weighted via the processor among the plurality of points in time logic using fuzzy logic, with a relatively higher weight given to those of the plurality of points in time that are closer in time to when the target vehicle resumes movement, to generate a time indexed weighted interpretation of the driver attentiveness.

Also in an exemplary embodiment, the step of monitoring the driver includes monitoring eye movement of the driver via one or more sensors; and the step of calculating the driver attentiveness score includes calculating the driver attentiveness score via the processor based on the eye movement of the driver, using sensor data obtained via the one or more sensors.

Also in an exemplary embodiment, the driver attentiveness score is calculated via the processor based on whether the driver is looking at a road in front of the vehicle.

Also in an exemplary embodiment, the driver attentiveness score is calculated via the processor using different values assigned for the driver attentiveness score for each of the following: whether the driver is looking directly ahead of the vehicle along the road; whether the driver is looking elsewhere outside the vehicle; whether the driver is looking at center console inside the vehicle; and whether the eyes of the driver are closed.

Also in an exemplary embodiment, the step of automatically resuming movement includes automatically resuming movement of the vehicle, via instructions provided by the processor, when the driver attentiveness score exceeds a predetermined threshold following a predetermined amount of time, as determined via the processor using a timer; and the method further includes providing a notification for the driver, via instructions provided by the processor to a notification device of the vehicle, requesting driver input to initiate resumption of movement of the vehicle, rather than automatically resuming movement of the vehicle, when the driver attentiveness score does not exceed the predetermined threshold following the predetermined amount of time.

In another exemplary embodiment, a system is provided for controlling adaptive cruise control functionality for a vehicle, the system including: one or more sensors disposed onboard the vehicle and configured to obtain sensor data for monitoring a driver of the vehicle while the vehicle is stopped during adaptive cruise control operation while a target vehicle in front of the vehicle has stopped; and a processor coupled to the one or more sensors and configured to provide instructions for automatically resuming movement of the vehicle, when the target vehicle resumes movement, based on the monitoring of the driver of the vehicle.

Also in one embodiment, the processor is further configured to: calculate a driver attentiveness score based on the monitoring of the driver while the vehicle is stopped during adaptive cruise control operation while the target vehicle in front of the vehicle has stopped; and provide instructions for automatically resuming movement of the vehicle when the target vehicle resumes movement, based on the calculated driver attentiveness score.

Also in one embodiment, the processor is further configured to: calculate the driver attentiveness score along a sliding window including a plurality of points in time while the vehicle is stopped until the target vehicle resumes movement; and weight the driver attentiveness score among the plurality of points in time logic using fuzzy logic, with a relatively higher weight given to those of the plurality of points in time that are closer in time to when the target vehicle resumes movement, to generate a time indexed weighted interpretation of the driver attentiveness.

Also in one embodiment, the one or more sensors are further configured to monitor eye movement of the driver; and the processor is further configured to calculate the driver attentiveness score based on the eye movement of the driver, including whether the driver is looking at a road in front of the vehicle, using sensor data obtained via the one or more sensors.

Also in one embodiment, the processor is further configured to calculate the driver attentiveness score using different values assigned for the driver attentiveness score for each of the following: whether the driver is looking directly ahead of the vehicle along the road; whether the driver is looking elsewhere outside the vehicle; whether the driver is looking at center console inside the vehicle; and whether the eyes of the driver are closed.

Also in one embodiment, the processor is further configured to: provide instructions for automatically resuming movement of the vehicle when the driver attentiveness score exceeds a predetermined threshold following a predetermined amount of time, as determined via the processor using a timer; and provide instructions for a notification device of the vehicle to provide a notification for the driver requesting driver input to initiate resumption of movement of the vehicle, rather than automatically resuming movement of the vehicle, when the driver attentiveness score does not exceed the predetermined threshold following the predetermined amount of time.

In another exemplary embodiment, a vehicle is provided that includes a body, a drive system, and a control system for controlling the adaptive cruise control functionality for the vehicle. The drive system is disposed within the body, and has adaptive cruise control functionality. The control system includes: one or more sensors disposed onboard the vehicle and configured to obtain sensor data for monitoring a driver of the vehicle while the vehicle is stopped during adaptive cruise control operation while a target vehicle in front of the vehicle has stopped; and a processor coupled to the one or more sensors and configured to provide instructions for automatically resuming movement of the vehicle, when the target vehicle resumes movement, based on the monitoring of the driver of the vehicle.

Also in one embodiment, the processor is further configured to: calculate a driver attentiveness score based on the monitoring of the driver while the vehicle is stopped during adaptive cruise control operation while the target vehicle in front of the vehicle has stopped; and provide instructions for automatically resuming movement of the vehicle when the target vehicle resumes movement, based on the calculated driver attentiveness score.

Also in one embodiment, the processor is further configured to: calculate the driver attentiveness score along a sliding window including a plurality of points in time while the vehicle is stopped until the target vehicle resumes movement; and weight the driver attentiveness score among the plurality of points in time logic using fuzzy logic, with a relatively higher weight given to those of the plurality of points in time that are closer in time to when the target vehicle resumes movement, to generate a time indexed weighted interpretation of the driver attentiveness.

Also in one embodiment, the one or more sensors are further configured to monitor eye movement of the driver; and the processor is further configured to calculate the driver attentiveness score based on the eye movement of the driver, using sensor data obtained via the one or more sensors.

Also in one embodiment, the processor is further configured to calculate the driver attentiveness score based on whether the driver is looking at a road in front of the vehicle.

Also in one embodiment, the processor is further configured to calculate the driver attentiveness score using different values assigned for the driver attentiveness score for each of the following: whether the driver is looking directly ahead of the vehicle along the road; whether the driver is looking elsewhere outside the vehicle; whether the driver is looking at center console inside the vehicle; and whether the eyes of the driver are closed.

Also in one embodiment, the processor is further configured to: provide instructions for automatically resuming movement of the vehicle when the driver attentiveness score exceeds a predetermined threshold following a predetermined amount of time, as determined via the processor using a timer; and provide instructions for a notification device of the vehicle to provide a notification for the driver requesting driver input to initiate resumption of movement of the vehicle, rather than automatically resuming movement of the vehicle, when the driver attentiveness score does not exceed the predetermined threshold following the predetermined amount of time.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
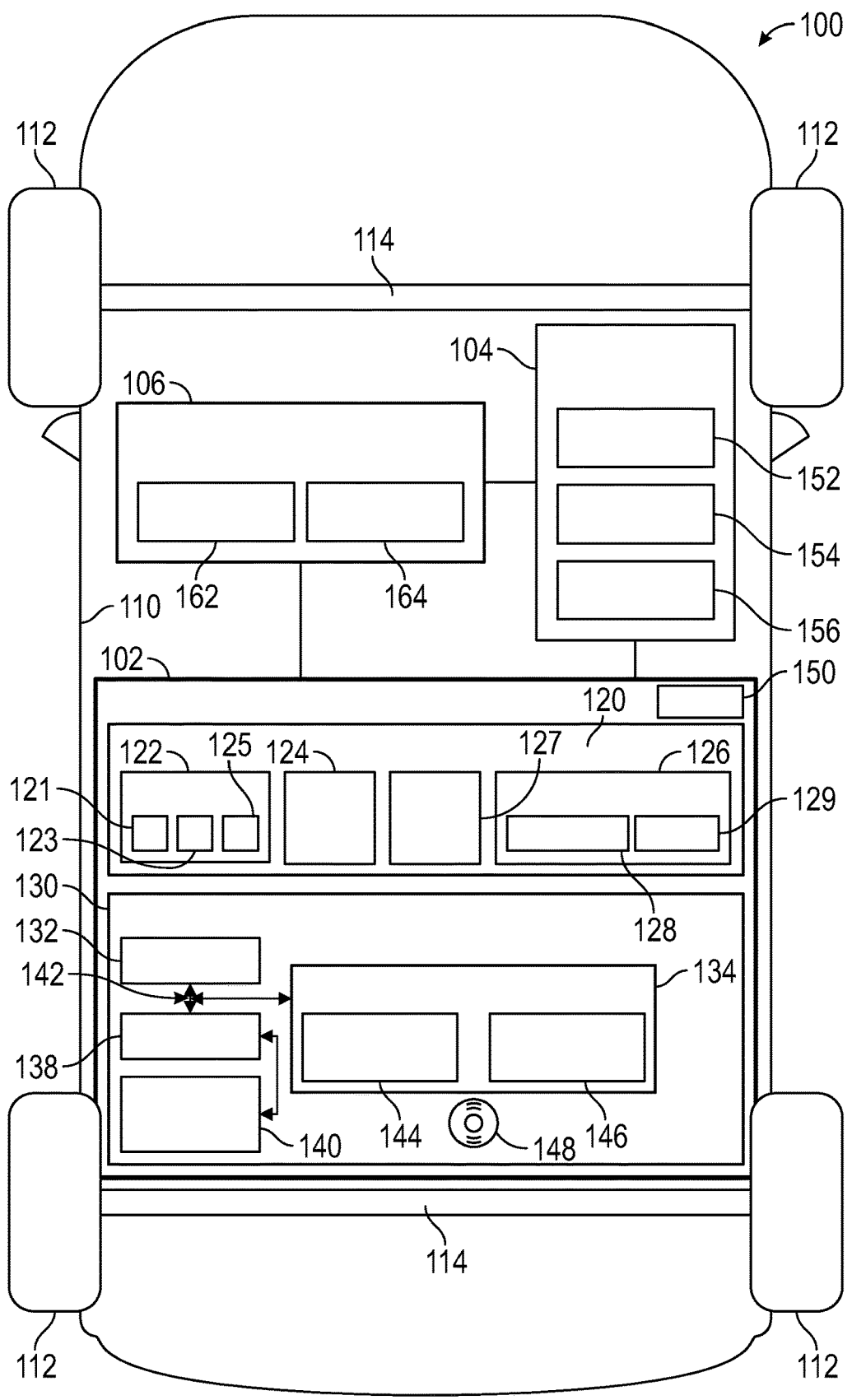
FIG. 1 is a functional block diagram of a vehicle that includes a control system for controlling adaptive cruise control functionality for the vehicle with respect to stopping and resuming movement when a target vehicle stops and resumes movement, in accordance with an exemplary embodiment.

FIG. 1 illustrates a vehicle 100, according to an exemplary embodiment. As described in greater detail further below, the vehicle 100 includes a control system 102 for controlling adaptive cruise control functionality for the vehicle with respect to stopping and resuming movement when a target vehicle stops and resumes movement, in accordance with an exemplary embodiment.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise one or more other types of vehicles. In addition, in various embodiments, it will also be appreciated that the vehicle 100 may comprise any number of other types of mobile platforms.

In the depicted embodiment, the body 110 of the vehicle 100 substantially encloses other components of the vehicle 100. Also in the depicted embodiment, the vehicle 100 includes a plurality of wheels 112 and a plurality of axles 114. The wheels 112 are each rotationally coupled to a respective one or more of the axles 114 near a respective corner of the body 110 to facilitate movement of the vehicle 100. In one embodiment, the vehicle 100 includes four wheels 112 and two axles 114, although this may vary in other embodiments (for example for trucks and certain other vehicles).

In various embodiments, the vehicle 100 includes a drive system 106 that drives the wheels 112. The drive system 106 preferably comprises a propulsion system. In certain exemplary embodiments, the drive system 106 comprises an internal combustion engine and/or an electric motor/generator. In certain embodiments, the drive system 106 may vary, and/or two or more drive systems 106 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments the drive system 106 includes a propulsion component 162 and a braking components 164. In various embodiments, the propulsion component 162 provides movement of the vehicle 100 (e.g., via movement of the wheels 112 via the axles 114) when directed to do so by the control system 102 and/or one or more other control systems for the vehicle 100. Also in various embodiments, the braking component 164 provides braking for the vehicle 100 (e.g., via engagement of a braking system for the vehicle 100) when directed to do so by the control system 102 and/or one or more other control systems for the vehicle 100.

Also as depicted in FIG. 1, in various embodiments, the vehicle 100 also includes a number of user input devices 152 for providing user control for the drive system 106. In various embodiments, the user input devices 152 include one or more adaptive cruise control input devices 152, accelerator input devices 154, and/or brake input devices 156 for controlling operation of the vehicle 100 via the drive system 106, among other possible devices and systems.

In various embodiments, the adaptive cruise control input devices 152 include one or more buttons, switches, knobs, dials, touch screen devices, and/or other devices for the driver to communicate driver intentions and/or instructions for the control system 102 for control of the adaptive cruise control functionality for the vehicle 100. For example, in certain embodiments, the driver may engage one or more such adaptive cruise control input devices 152 to start and resume full speed adaptive cruise control for the vehicle 100.

Also in various embodiments, the one or more accelerator input devices 154 include an accelerator pedal and/or one or more other devices for the driver to request movement of, and/or a change in speed and/or acceleration of, the vehicle 100 via the propulsion component 162 of the drive system 106.

In addition, in various embodiments, the one or more brake input devices 156 include one or more brake pedals and/or other devices for the driver to request stopping of, and/or a change in speed and/or acceleration of, the vehicle 100 via the braking component 164 of the drive system 106.

As noted above, in various embodiments, the control system 102 controls adaptive cruise control functionality for the vehicle with respect to stopping and resuming movement when a target vehicle stops and resumes movement, in accordance with an exemplary embodiment. As depicted in various embodiments, the control system 102 is coupled to the above-referenced drive system 106 as well as to user input devices 104 for the vehicle.

Also as depicted in FIG. 1, in various embodiments, the control system 102 includes a sensor array 120 and a controller 130.

In various embodiments, the sensor array 120 includes one or more input sensors 122, speed sensors 124, detection sensors 126, and driver monitoring sensors (DMS) 127.

In various embodiments, the input sensors 122 are coupled to the user input devices 104, and receive and detect commands therefrom. In certain embodiments, the input sensors 122 include one or more adaptive cruise control sensors 121 that are coupled to the adaptive cruise control input devices 152, and receive and detect commands therefrom (e.g., for starting and resumption of full speed adaptive cruise control movement of the vehicle 100). Also in various embodiments, the input sensors 122 also include one or more accelerator pedal sensors 123 for detecting and measuring the driver's engagement of the accelerator pedal 154 (e.g., for the driver's request or command for movement of the vehicle 100 and/or establishing a speed of the vehicle 100, including for adaptive cruise control movement of the vehicle 100). In addition, in various embodiments, the input sensors 122 also include one or more brake pedal sensors 125 for detecting and measuring the driver's engagement of the brake pedal 156 (e.g., for the driver's request or command for stopping of the vehicle 100 and/or stopping and/or resumption of use of adaptive cruise control movement of the vehicle 100).

Also in various embodiments, the speed sensors 124 measure or determine a speed or velocity of the vehicle 100. For example, in certain embodiments, the speed sensors 124 comprise one or more wheel speed sensors, accelerometers, and/or other sensors for measuring data for determining a speed or velocity of the vehicle 100.

In various embodiments, the detection sensors 126 are configured for detecting and monitoring one or more target vehicles in front of the vehicle 100 (also referred to as the "host vehicle"). In various embodiments, the detection sensors 126 include one or more of the cameras 128 that face in front of the vehicle 100, and also one or more radar sensors 129 that face in front of the vehicle, for example in order to detect target vehicles in front of the host vehicle 100 and/or other objects on or near a roadway or path in front of the vehicle 100. Also in certain embodiments, the detection sensors 126 may also include one or more other types of detection sensors (e.g., including, in some embodiments, RADAR, LiDAR, SONAR, or the like).

In various embodiments, the driver monitoring sensors (DMS) 127 monitor a driver of the vehicle 100. For example, in various embodiments, the driver monitoring sensors 127 comprise one or more infrared sensors, cameras, and/or other sensors that are configured to monitor a head, face, or eyes of the driver, including as to whether the driver is looking ahead on the road, elsewhere outside the vehicle 100, toward a center console system for the vehicle 100, and/or whether the driver's eyes are open or closed. As described in greater detail further below in connection with the process 200 of FIGS. 2 and 3, in various embodiments, sensor data from the driver monitoring sensors 127 is utilized in calculating a driver attentiveness score that is used by the controller 130 in controlling full speed range adaptive cruise control (FSRACC) for the vehicle 100, including when a detected target vehicle stops and subsequently resumes movement.

Also as depicted in FIG. 1, the controller is coupled to the sensor array 120. In various embodiments, the controller 130 controls full speed adaptive cruise control functionality for the vehicle 100, including automatically stopping and restarting movement of the vehicle 100 in response to the detected stopping and restarting of movement of the target vehicle, based on driver inputs and measured values as measured by the sensor array 120 and determinations pertaining thereto (including the driver attentiveness score that is calculated therefrom), for example as set forth in greater detail further below in connection with the process 200 of FIGS. 2 and 3 and the implementations of FIG. 4. As depicted in FIG. 1, in various embodiments, the controller 130 comprises a computer system comprising a processor 136, a memory 134, an interface, a storage device 140, a bus 142, and a disk 148.

As depicted in FIG. 1, the controller 130 comprises a computer system. In certain embodiments, the controller 130 may also include the sensor array 120 and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 136, a memory 134, an interface 138, a storage device 140, and a bus 142. The processor 136 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 136 executes one or more programs 144 contained within the memory 134 and, as such, controls the general operation of the controller 130 and the computer system of the controller 130, generally in executing the processes described herein, such as the process 200 discussed further below in connection with FIGS. 2 and 3.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 136. In the depicted embodiment, the memory 134 stores the above-referenced program 144 along with one or more stored values 146 (e.g., including, in various embodiments, predetermined threshold values pertaining to the driver attentiveness score and/or timers utilized by the controller 130 in controlling the adaptive cruise control functionality in accordance with the process 200 depicted in FIGS. 2 and 3 and described in greater detail further below in connection therewith).

The bus 142 serves to transmit programs, data, status and other information or signals between the various components of the computer system of the controller 130. The interface 138 allows communications to the computer system of the controller 130, for example from a system driver and/or another computer system, and can be implemented using any suitable method and apparatus. In one embodiment, the interface 138 obtains the various data from the sensor array 120, the drive system 108, the suspension system 106, and/or one or more other components and/or systems of the vehicle 100. The interface 138 can include one or more network interfaces to communicate with other systems or components. The interface 138 may also include one or more network interfaces to communicate with technicians, and/or one or more storage interfaces to connect to storage apparatuses, such as the storage device 140.

The storage device 140 can be any suitable type of storage apparatus, including various different types of direct access storage and/or other memory devices. In one exemplary embodiment, the storage device 140 comprises a program product from which memory 134 can receive a program 144 that executes one or more embodiments of one or more processes of the present disclosure, such as the steps of the process 200 discussed further below in connection with FIGS. 2 and 3. In another exemplary embodiment, the program product may be directly stored in and/or otherwise accessed by the memory 134 and/or one or more other disks 148 and/or other memory devices.

The bus 142 can be any suitable physical or logical means of connecting computer systems and components. This includes, but is not limited to, direct hard-wired connections, fiber optics, infrared and wireless bus technologies. During operation, the program 144 is stored in the memory 134 and executed by the processor 136.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 136) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
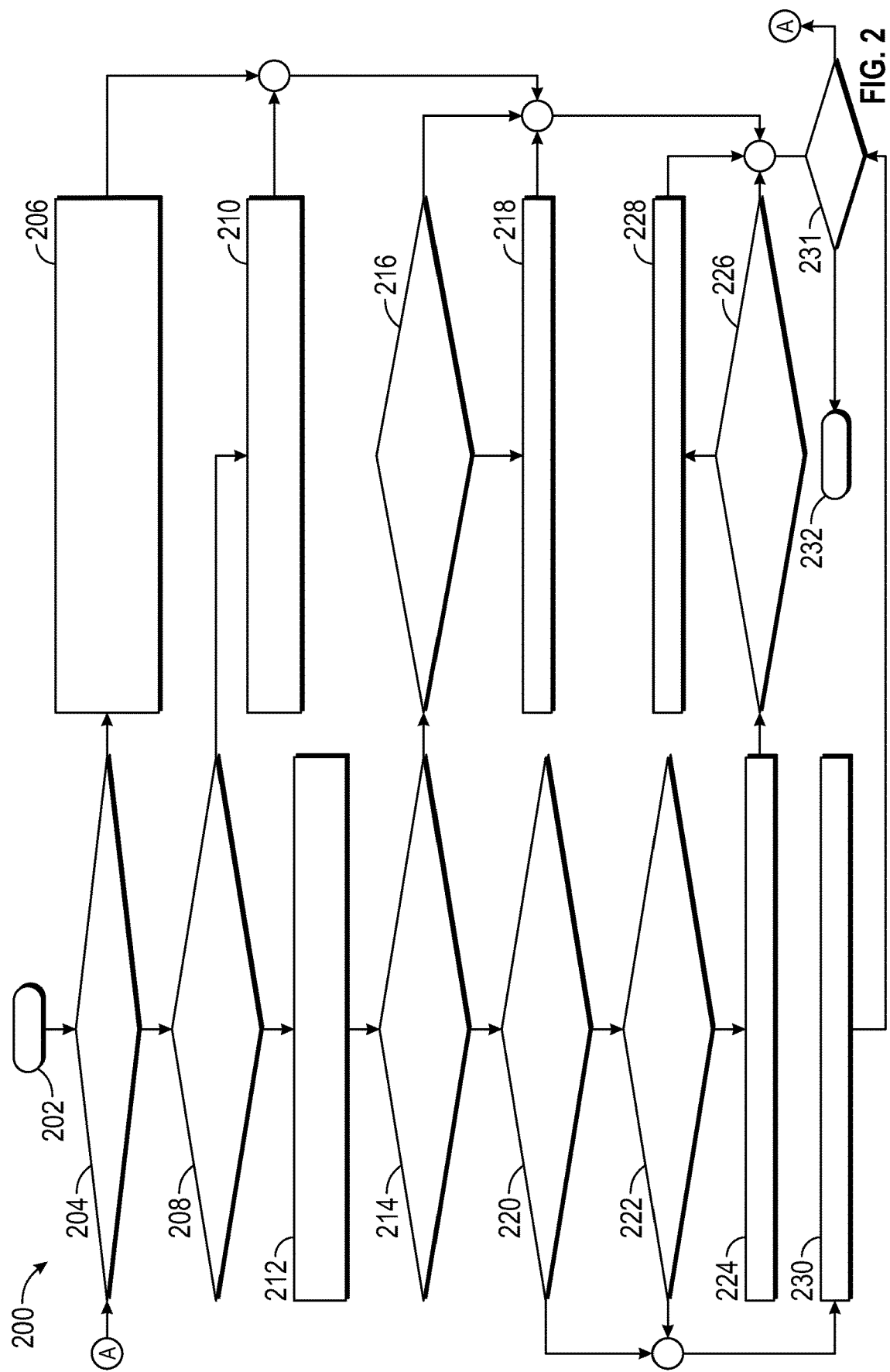
FIG. 2 is a flowchart of a method for controlling adaptive cruise control functionality for a vehicle with respect to stopping and resuming movement when a target vehicle stops and resumes movement, and that can be implemented in connection with the vehicle and the control system of FIG. 1, in accordance with an exemplary embodiment.

FIG. 2 is a flowchart of a method 200 for controlling adaptive cruise control functionality for a vehicle with respect to stopping and resuming movement when a target vehicle stops and resumes movement, in accordance with an exemplary embodiment. In various embodiments, the method 200 can be implemented in connected with the vehicle 100, including the control system 102 thereof, of FIG. 1.

In various embodiments, the process 200 starts at 202, when a driver activates adaptive cruise control (e.g., full speed range adaptive cruise control) during operation of the vehicle 100 of FIG. 1. In various embodiments, the process 200 continues throughout the duration of the operation of the vehicle 100 with adaptive cruise control.

In various embodiments, a determination is made at 204 as to whether the vehicle 100 of FIG. 1 (also referred to as the host vehicle) is moving. In various embodiments, this determination is made by the processor 132 of FIG. 1 using sensor data obtained via one or more speed sensors 124 of FIG. 1 (e.g., in various embodiments, one or more wheels speed sensors, accelerometers, and/or more other speed sensors). In various embodiments, the vehicle 100 is determined to be moving if the speed of the vehicle 100 is greater than a predetermined threshold. Also in various embodiments, if the speed of the vehicle 100 is less than the predetermined threshold for a predetermined amount of time, then the vehicle 100 is determined to be not moving or stopped. In certain embodiments, the predetermined threshold is equal to zero. In certain other embodiments, the predetermined threshold may be slightly above zero. For example, in one embodiment, the threshold is equal to $\frac{1}{100}^{th}$ meters per second (0.01 m/s); however, this may vary in other embodiments.

If it is determined at 204 that the vehicle 100 is moving, then various triggers for vehicle movement resumption are reset at 206. Specifically, in various embodiments, (i) an adaptive cruise control automatic resumption flag is set to "false"; (ii) a target vehicle movement notifier flag is set equal to "false"; (iii) a sliding window of data buffer index for driver on-road attentiveness assessment is set equal to "start"; and (iv) a post target vehicle drive away timer is re-set. In various embodiments, these actions are taken by the processor 132 of FIG. 1.

In various embodiments, following 206, the process proceeds to 231. During 231, a determination is made as to whether termination of adaptive cruise control (e.g., full speed adaptive cruise control) is warranted. For example, in certain embodiments, termination of adaptive cruise control may be warranted if the driver provides a command for termination of adaptive cruise control (e.g., by an engaging a brake pedal 156 and/or an "off" position for an adaptive cruise control input device 152 of FIG. 1). In various embodiments, this determination is made by the processor 132 of FIG. 1 based on sensor data obtained from the sensor array 120 of FIG. 1.

If it is determined at 231 that adaptive cruise control termination is warranted, then the process terminates at 232 in various embodiments. Conversely, if it is determined at 231 that adaptive cruise control termination is not warranted, then the process returns to step 204 in a new iteration, repeating until a determination is made in a subsequent determination is made in another iteration of 231 that adaptive cruise control termination is warranted (at which point the process 200 terminates at 232).

With reference back to 204, if it is instead determined at 204 that the host vehicle is not moving, then a determination is made at 208 as to whether the host vehicle has just stopped as a result of the stopping of a target vehicle. Specifically, in various embodiments, this determination is made as "yes" when the vehicle 100 is stopped at this computing iteration because a target vehicle that the host vehicle 100 has been following is stopped in front of the host vehicle 100. In various embodiments, this determination is made by the processor 132 of FIG. 1 based on sensor data from the sensor array 120 of FIG. 1, including from one or more detection sensors 126 of FIG. 1.

If it is determined at 208 that the host vehicle 100 has just been stopped at the current computing iteration as a result of the stopping of a target vehicle, then the process proceeds to 210. During 210, the above-referenced sliding window for driver on-road attentiveness assessment is started to process DMS output data. In various embodiments, this is performed by the processor 132 of FIG. 1. In various embodiments, the process then proceeds to 231. As noted above, during 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

Conversely, if it is instead determined at 208 that the host vehicle 100 has already been stopped for a while (e.g., if the host vehicle 100 has been determined to be stopped in the previous iterations due to the stopping of a target vehicle), then the process proceeds instead to 212.

During 212, the sliding window for driver on-road attentiveness assessment is updated. In various embodiments, the sliding window of the data buffer is updated by adding fresh data to the front of the queue and removing aged data from the end of the queue. Also in various embodiments, the updating of the sliding window includes (i) adding a new DMS output data into the data buffer at current data buffer index position; and (ii) incrementing the data buffer index by one for the coming DMS output data in the next computing iteration]. In various embodiments, this is performed by the processor 132 of FIG. 1.

Following 212, in various embodiments, a determination is made during 214 as to whether the target vehicle has been deemed, with a high degree of confidence, to be driving away. In various embodiments, this determination is made by the processor 132 of FIG. 1. For example, in certain embodiments, the target vehicle is determined to be driving away with a high degree of confidence based at least in part on two or more detection sensors 126 (e.g., in certain embodiments, a camera and a radar device) confirming that the target vehicle is moving. Also in various embodiments, the target vehicle drive-away event is determined not only by its relative speed to the host vehicle but also by its relative acceleration to the host vehicle and its relative distance change to the host vehicle.

In various embodiments, if it is determined at 214 that the target vehicle is not deemed with a high degree of confidence to be driving away, then a determination is made at 216 as to whether the target vehicle is deemed to be driving away (with a low degree of confidence). In various embodiments, this determination is made by the processor 132 of FIG. 1. For example, in certain embodiments, the target vehicle is determined to be driving away with a low degree of confidence when only one detection sensor 126 (e.g., in certain embodiments, a camera or a radar device) confirms that the target vehicle is moving).

In various embodiments, if it is determined at 216 that the target vehicle is deemed to be driving away (with a low degree of confidence), then the above-referenced target vehicle movement notifier flag is set to "true" at 218. In various embodiments, a notification is provided to the driver inquiring as to whether the driver wishes to resume movement of the vehicle. In various embodiments, resumption of movement of the vehicle 100 is provided only when the driver requests such movement, for example via the adaptive cruise control input device 152 of FIG. 1 and/or the accelerator pedal 154 of FIG. 1 (rather than automatic movement of the vehicle 100). In various embodiments, the process then proceeds to 231. As noted above, during 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

Conversely, in various embodiments, if it is instead determined at 216 that the target vehicle is not deemed to be driving away (with any degree of confidence), then the above-referenced target vehicle movement notifier flag is not changed from its prior setting. In various embodiments, the process then proceeds to 231. As noted above, during 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

With reference back to 214, if it is determined at 214 that the target vehicle is deemed with a high degree of confidence to be driving away, then a determination is made at 220 as to whether a sliding window data buffer has been fulfilled with the DMS output data. In various embodiments, this determination is made by the processor 132 of FIG. 1. For example, in certain embodiments, the sliding window data buffer is deemed to be fulfilled if the host vehicle has been determined to be stopped behind the target vehicle for at least a predetermined amount of time. In certain embodiments, this predetermined amount of time is equal to four seconds; however, this may vary in other embodiments.

If it is determined at 220 that the sliding window data buffer has not been fulfilled, then the above-referenced adaptive cruise control auto-resume flag is set equal to true at 230. In various embodiments, following 230, the process then proceeds to 231. As noted above, during 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

With reference back to 220, if is determined instead that the sliding window data buffer is fulfilled, then a determination is made at 222 as to whether a driver on-road attentiveness is confirmed. In various embodiments, this determination is made by the processor 132 of FIG. 1.

Figure 3:
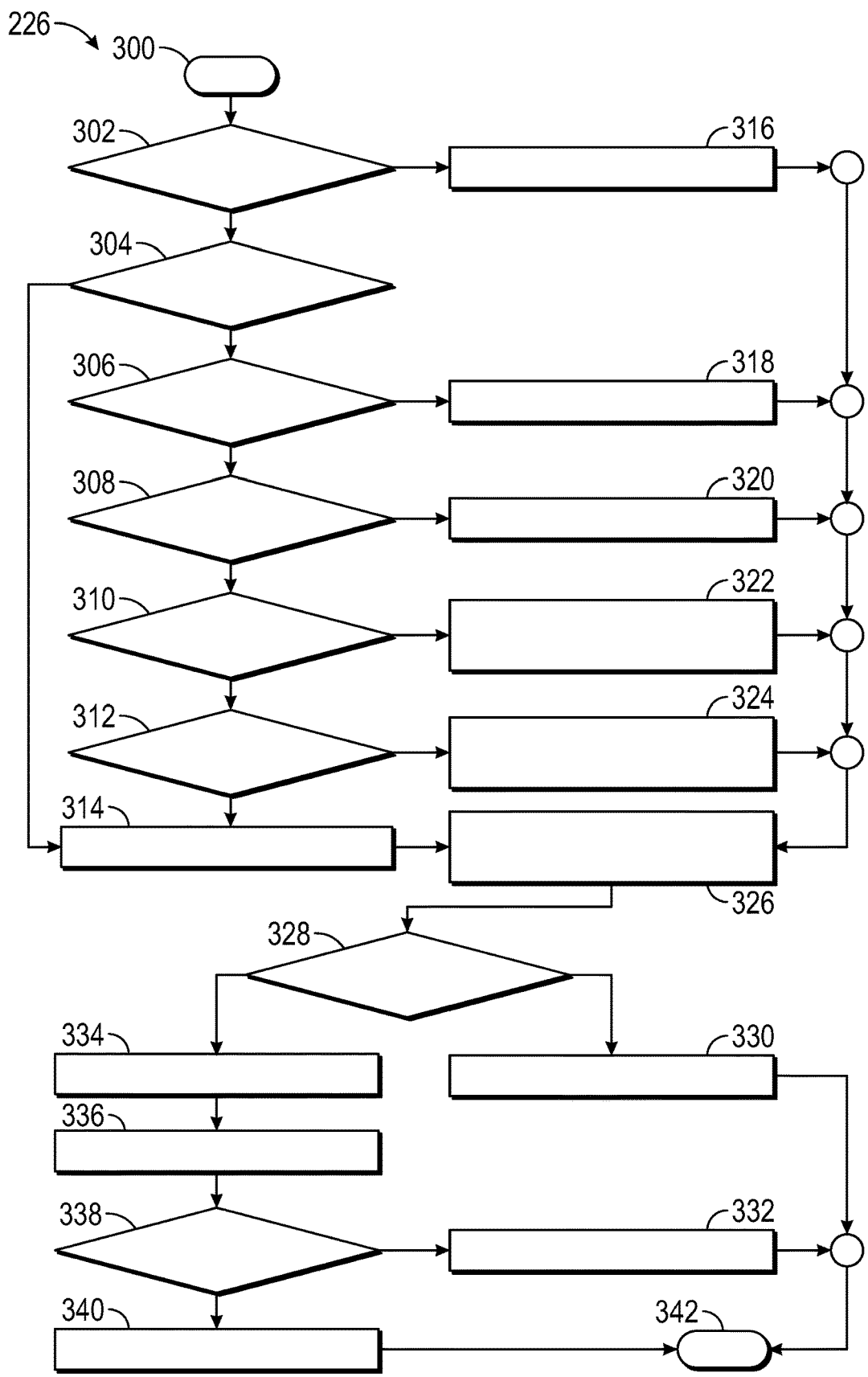
FIG. 3 is a flowchart of a step of the process of FIG. 2, namely, the step of confirming driver on-road attentiveness, in accordance with an exemplary embodiment.

With reference to FIG. 3, a flowchart is provided for the step 222 of FIG. 2, namely, the determining as to whether a driver on-road attentiveness is confirmed. As shown in FIG. 3, in various embodiments, step 222 begins at 300 of FIG. 3, after which a determination is made at 302 as to whether the driver attentiveness sliding window has been reset (e.g., in step 206 of FIG. 2). In various embodiments, this determination is made by the processor 132 of FIG. 1.

In various embodiments, if it is determined at 302 that the sliding window needs to be reset, then a total driver attentiveness score is set equal to zero at 316. In various embodiments, this is performed by the processor 132 of FIG. 1. The process then proceeds to step 326, described further below.

Conversely, if it is instead determined at 302 that the sliding window does not need to be reset, then a determination is made at 304 as to whether the driver attentiveness state from DMS output is faulted. In various embodiments, this determination is made by the processor 132 of FIG. 1. In various embodiments, the driver attentiveness state is determined to be faulted if there is an error in assessing attentiveness of the driver, such as an error in monitoring eye movement of the driver (e.g., in certain embodiments, if one or more of the driver monitoring sensors 127 are not performing correctly).

If it is determined at 304 that driver attentiveness state from DMS output is faulted, then the process proceeds to 314, described further below, as the driver attentiveness score is set equal to a default value. Conversely, if it is determined at 304 that the driver attentiveness state is not faulted, then the process proceeds instead to 306, described directly below.

During 306, a determination is made as to whether the driver is looking at (or in some embodiments, facing) forward on a roadway in which the vehicle 100 is travelling. In various embodiments, this determination is made by the processor 132 of FIG. 1 based on data provided by the driver monitoring sensors 127 of FIG. 1. For example, in various embodiments, sensor data from one or more infrared sensors, cameras, and/or other sensors of the driver monitoring sensors 127 are utilized to monitor eye movement of the driver. Also in various embodiments, if the eye movement indicates that the driver is looking at (or in some embodiments, facing) forward on the roadway, then the driver attentiveness monitoring state is deemed to be "on road".

If the driver attentiveness monitoring state is deemed to be "on road" in 306, then the driver attentiveness score is adjusted pursuant to a "on-road" score at 318. In various embodiments, the "on-road" score has a relatively higher numerical value as compared with other possible states (e.g., as described below, in which the driver is not looking forward on the roadway, and in one embodiment directly in front of the vehicle 100). In one embodiment, the "on-road" score is equal to ten; however, this may vary in other embodiments. In various embodiments, the process then proceeds to step 326, described further below.

Conversely, if the driver attentiveness monitoring state is not deemed to be "on road" in 306, then the process proceeds instead to step 308, described directly below.

During 308, a determination is made as to whether the driver is looking at (or in some embodiments, facing) outside the vehicle but not directly forward on a roadway in which the vehicle 100 is travelling. In various embodiments, this determination is made by the processor 132 of FIG. 1 based on data provided by the driver monitoring sensors 127 of FIG. 1 (e.g., via infrared sensors, cameras, and/or other sensors monitoring eye movement of the driver). Also in various embodiments, if the eye movement indicates that the driver is looking at (or in some embodiments, facing) outside the vehicle but not forward on the roadway (e.g., to the left or right on the roadway or beyond the roadway), then the driver attentiveness monitoring state is deemed to be "off road".

If the driver attentiveness monitoring state is deemed to be "off road" in 308, then the driver attentiveness score is adjusted pursuant to a "off-road" score at 320. In various embodiments, the "off-road" score of 320 has a relatively lower numerical value as compared with the "on-road" score of 318. In one embodiment, the "off-road" score is equal to five; however, this may vary in other embodiments. In various embodiments, the process then proceeds to step 326, described further below.

Conversely, if the driver attentiveness monitoring state is not deemed to be "off road" in 308, then the process proceeds instead to step 310, described directly below.

During 310, a determination is made as to whether the driver is looking at (or in some embodiments, facing) a center console or control system inside the vehicle 100. In various embodiments, this determination is made by the processor 132 of FIG. 1 based on data provided by the driver monitoring sensors 127 of FIG. 1 (e.g., via one or more infrared sensors, cameras, and/or other sensors monitoring eye movement of the driver). Also in various embodiments, if the eye movement indicates that the driver is looking at (or in some embodiments, facing) inside the vehicle at a vehicle dashboard and/or one or more other vehicle controls in or proximate a center console of the vehicle, then the driver attentiveness monitoring state is deemed to be "center-console".

If the driver attentiveness monitoring state is deemed to be "center console" in 310, then the driver attentiveness score is adjusted pursuant to a "center console" score at 322. In various embodiments, the "center console" score of 322 has a relatively lower numerical value as compared with the "on-road" score of 318. In certain embodiments, the "center console" has a value that is equal to the "off-road" score of 320. In certain other embodiments, the "center console" score of 322 has a value that is less than the "off-road" score of 322. For example, in certain embodiments, the "center console" has a value of five, and in certain other values the "center console" value of three, among various other possible values. In various embodiments, the process then proceeds to step 326, described further below.

Conversely, if the driver attentiveness monitoring state is not deemed to be "center console" in 310, then the process proceeds instead to step 312, described directly below.

During 312, a determination is made as to whether the driver's eyes are closed. In various embodiments, this determination is made by the processor 132 of FIG. 1 based on data provided by the driver monitoring sensors 127 of FIG. 1 (e.g., via one or more infrared sensors, cameras, or other sensors monitoring eye movement of the driver). Also in various embodiments, if the driver's eyes are determined to be closed, then the driver attentiveness monitoring state is deemed to be "eye-closed".

If the driver attentiveness monitoring state is deemed to be "eye-closed" in 310, then the driver attentiveness score is adjusted pursuant to an "eye-closed" score at 324. In various embodiments, the "eye-closed" score of 324 has a relatively lower numerical value as opposed to any of the other scores noted above. In certain other embodiments, the "eye-closed" score is equal to zero, while in other embodiments the "eye-closed" score is equal to a negative number (this may vary in other embodiments). In various embodiments, the process then proceeds to step 326, described further below.

Conversely, if the driver attentiveness monitoring state is not deemed to be "eye-closed" in 312, then the process proceeds instead to 314.

During 314, the driver attentiveness score is set to a default score. In various embodiments, this is performed by the processor 132 of FIG. 1. In various embodiments, the default score is equal to zero. As alluded to above, this default score is also assigned in the event that there is a fault in monitoring the attentiveness of the driver (for example, if one or more infrared sensors, cameras, and/or other sensors are determined in step 304 to not be performing correctly). In various embodiments, following step 314, the process proceeds to the above-referenced step 326. During step 326, a total driver attentiveness score is calculated. In various embodiments, the total driver attentiveness score is calculated by adding up the various scores (inside the sliding window data buffer) that were set in various iterations of steps 306-314 for various points in time as the host vehicle 100 is stopped due to the target vehicle being stopped in front of the host vehicle 100. In various embodiments, the total driver attentiveness score is weighted, with relatively higher weights being provided to those points in time that are closer in time to when the target vehicle resumes movement, to generate a time indexed weighted interpretation of the driver attentiveness. In various embodiments, fuzzy logic is utilized for the weighting across the various points in time in generating the time index weighted interpretation of the driver attentiveness. In various embodiments, the time indexed weighting factors (as well as the individually assigned driver attentiveness state scores themselves) set in the various iterations of steps 306-326 can be optimized through a machine learning process with a data set collected, for example by a vehicle user experience team. In various embodiments, the data set will encompass most (if not all) desirable conditions to trigger the FSRACC Auto-Resume function or the FSRACC Go-Notifier function. Also in various embodiments, the "desirable conditions" are defined to meet or balance the competing requirements from the system safety metric and the auto-resume function availability metric. In addition, in various embodiments, a unique weighting is performed for each driver attentiveness monitoring state, which allows for the time based weighting to be independent, for example so that the negative impact of an "eye-closed" state can have more impact to the total score if the detection of that state is in the "fresh" section of the sliding window and less impact if the detection of that state was farther in the past, and so on.

Also in various embodiments, a determination is made at 328 as to whether the sliding window data buffer is fulfilled. In various embodiments, this determination is made by the processor 132 of FIG. 1 after whether a predetermined amount of time has elapsed. In certain embodiments, this predetermined amount of time is equal to four seconds; however, this may vary in other embodiments.

If it is determined at 328 that the sliding window data buffer has not yet been fulfilled, then the sliding window has not yet been determined to be completed. Accordingly, at step 330, a sliding window assessment completed flag is set to "False". In various embodiments, this is performed by the processor 132 of FIG. 1. Also in various embodiments, the process of FIG. 3 is completed at 342, and the process 200 then returns to FIG. 2 (as described in greater detail further below).

Conversely, if it is determined at 328 that the sliding window data buffer is fulfilled, then the sliding window has been determined to be completed. Accordingly, at step 334, a sliding window assessment completed flag is set to "True". In various embodiments, this is performed by the processor 132 of FIG. 1. Also in various embodiments, the process proceeds to step 336, described below.

During step 336, a sliding window array index is updated to provide new empty data buffer location for the new DMS output in the next iteration. In various embodiments, the sliding window data buffer array index is updated by incorporating the most recent values for the driver attentiveness score on a "first in first out" (FIFO) basis.

Also in various embodiments, following step 336, a determination is made in step 338 as to whether the total driver attentiveness score is greater than a predetermined threshold for automatic resumption of movement of the host vehicle 100. In various embodiments, the predetermined threshold is dependent on the gains of steps 318, 320, 322, and 324, and the number of attentiveness monitoring states that are evaluated. In addition, in various embodiments, this automatic resumption of vehicle movement threshold may be determined by the size or corresponding timer duration of sliding window data buffer, the individually assigned DMS output state scores, and the time indexed weighting factor. In certain embodiments, because the threshold is a function of the three aforementioned independent variables, it can be set appropriately by analyzing the real-world user experience data plus additional scenario-based simulated data. In addition, in various embodiments, the threshold can be optimized via a machine learning process on these data sets. Also in various embodiments, this determination is made by the processor 132 of FIG. 1 in comparing the weighted total driver attentiveness score of 326 with a predetermined value score required for resumption of automatic vehicle movement, for example as stored in the memory 134 of FIG. 1 as one or more stored values 146 thereof.

In various embodiments, if the total driver attentiveness score is determined to be greater than the predetermined threshold in step 338, then driver attentiveness is deemed to be sufficient for automatic resumption of the vehicle 100. Accordingly, a driver on-road attentiveness flag is set to "True" in step 340. In various embodiment, the sequence of FIG. 3 is then completed at 342, and the process then returns to FIG. 2 (as described in greater detail further below).

Conversely, in various embodiments, if the total driver attentiveness score is not determined to be greater than the predetermined threshold in step 338, then driver attentiveness is deemed to be insufficient for automatic resumption of the vehicle 100 at the current computing iteration. Accordingly, the driver on-road attentiveness flag is set to "False" in step 332. In various embodiment, the sequence of FIG. 3 is then completed at 342, and the process then returns to FIG. 2 (as described in greater detail directly below).

With reference back to FIG. 2, the driver on-road attentiveness flag is utilized in various embodiments in the determination of step 222 of FIG. 2 as to whether driver on-road attentiveness is confirmed.

Specifically, in various embodiments, if the driver on-road attentiveness flag is "True", then the driver on-road attentiveness is confirmed at step 222 (e.g., via the processor 132 of FIG. 1), and the process then proceeds to step 230. During step 230, automatic movement of the host vehicle 100 is resumed via the adaptive cruise control. In various embodiments, this is accomplished via instructions provided by the processor 132 of FIG. 1 to the driver system 106 and implemented by the driver system 106 (e.g., the propulsion component 162 thereof). In various embodiments, the process then proceeds to 231. As noted above, during 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

Conversely, in various embodiments, if the driver on-road attentiveness flag is "False", then the driver on-road attentiveness is not confirmed at step 222 (e.g., via the processor 132 of FIG. 1), and the process then proceeds instead to step 224. During step 224, a second timer (also referred to herein as a "post target vehicle drive away timer") is initiated via the processor 132 of FIG. 1.

In various embodiments, the determinations above (including the total driver on-road attentiveness score) continue as the post target vehicle drive away timer is running until a determination is made at 226 that the post target vehicle drive away timer has expired. In various embodiments, the post target vehicle drive away timer is less in magnitude than the sliding window. For example, in certain embodiments, the sliding window described above is equal to four seconds, whereas the post target vehicle drive-away timer is set to half a second; however, these values may vary in other embodiments. In various embodiments, the determination of step 226 as to the expiration of the post target vehicle drive away timer is made by the processor 132 of FIG. 2.

If it is determined at 226 that the that the post target vehicle drive away timer has not expired, then in various embodiments the process then proceeds to 231. As noted above, during 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

Conversely, if it is instead determined at 226 that the that the post target vehicle drive away timer has expired, then in various embodiments the process then proceeds instead to step 228. In various embodiments, during step 228, it is determined by the processor 132 of FIG. 1 that it may be appropriate for the host vehicle 100 to resume movement, but that the driver on-road attentiveness score does not warrant automated resumption of movement of the vehicle 100. Accordingly, in various embodiments, a notification is provided for the driver for initiation of movement of the vehicle 100. In various embodiments, the notification may include audible, visual, and/or haptic notifications via respective audible, visual, and/or haptic notifications on the notification devices 150 of FIG. 1 (e.g., a visual display on a display screen, an audio sound via a speaker, a vibration of a driver seat, or the like). Also in various embodiments, the processor 132 then waits for a response from the driver (e.g., the driver's engagement of the accelerator pedal 154 or a resumption button of the adaptive cruise control input device 152 of FIG. 1, or the like) before resumption of movement of the vehicle 100.

In various embodiments, the process then proceeds to 231. As noted above, during step 231, a determination is made as to whether termination of adaptive cruise control is warranted, and the process then either (a) returns to 204 in a new iteration if termination of adaptive cruise control is not warranted; or (b) terminates at 232 if termination of adaptive cruise control is warranted (per the discussion above).

Figure 4:
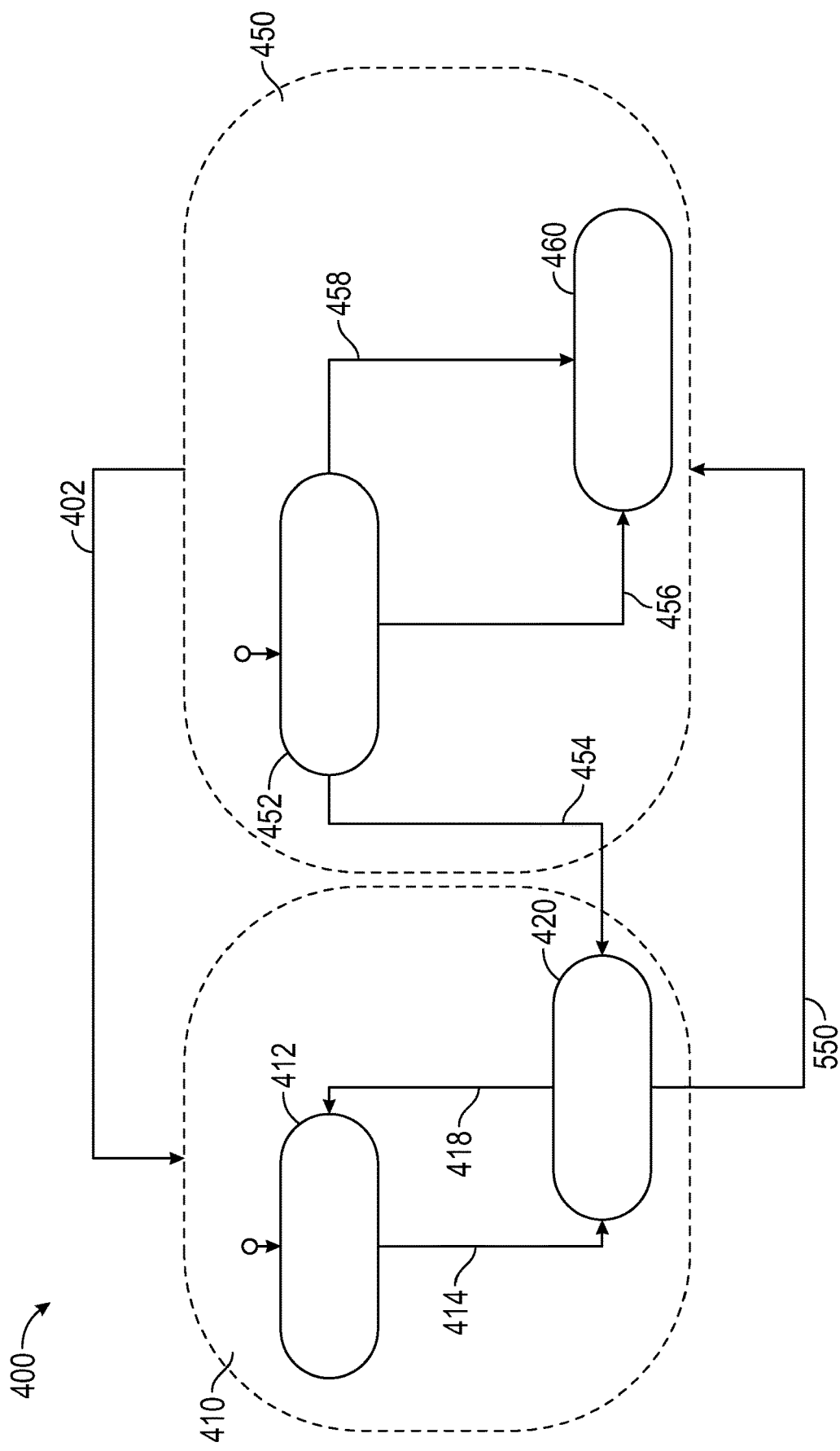
FIG. 4 is a vehicle state transition diagram illustrating various states associated with an exemplary implementation of the process of FIGS. 2 and 3, and that can be implemented in connection with the vehicle and the control system of FIG. 1, in accordance with an exemplary embodiment.

FIG. 4 is a vehicle state transition diagram 400 illustrating various states associated with an exemplary implementation of the process of FIG. 2 and FIG. 3, and that can be implemented in connection with the vehicle 100 and the control system 102 of FIG. 1, in accordance with an exemplary embodiment. The state 410 represents that a host vehicle is moving under full speed range adaptive cruise controls. The moving host vehicle longitudinal speed can be controlled based on driver set speed represented by its sub-state 412. The moving host vehicle longitudinal speed can also be controlled by a close-in-path-vehicle (CIPV) represented by its sub-state 420. The state 450 represents that a host vehicle is stopped following a target vehicle to its stop. The stopped host vehicle enters its sub-state 452 by default at the onset of host vehicle stopped event. Its other sub-state 460 can only be entered after the stopped host vehicle is determined to be no longer automatically resumption of its movement following target vehicle drive-away event. If the driver launches a host vehicle from a standstill under full speed range adaptive cruise controls, the state transition 402 governs to enter the default sub-state 412 as its destination. Conversely, if host vehicle under full speed range adaptive cruise controls follows a CIPV to a stop. the state transition 550 governs to enter the default state 452 as its destination.

As shown in FIG. 4, when a target vehicle is determined to be a CIPV for a moving host vehicle (i.e., if CIPV value does not equal to zero) at transition 418, the host vehicle longitudinal speed control state transitions from sub-state 412 to sub-state 420, Conversely, when the host vehicle determines that a target vehicle is no longer in front of itself or the target vehicle is no longer traversing at a slower vehicle speed than its own driver set vehicle speed (i.e., if CIPV value equals to zero) at transition 414, the host vehicle longitudinal speed control state transitions from sub-state 420 back to sub-state 412.

As depicted in FIG. 4, in various embodiments, the host vehicle 100 is stopped at sub-state 452 under its parent state 450, and can launch autonomously following a target vehicle motion. In various embodiments, three potential paths are evaluated in sequence of their respective priorities to trigger automatic resumption of movement functionality, or may resume only following driver input (e.g., based on the driver on-road attentiveness and in certain embodiments also based on one or more other criteria). In various embodiments, each of the steps, determinations, and actions depicted in FIG. 4 are performed via the processor 132 of FIG. 1 and/or instructions provided thereby.

As shown in FIG. 4, in a first priority state transition 458, if a CIPV is no longer detected unexpectedly (i.e., if a CIPV value changes to zero from a non-zero value) or the CIPV value is unexpected changed to a different non-zero value, then the vehicle 100 may only resume its movement following a driver input (e.g. the accelerator pedal 154 and/or adaptive cruise control input device 152 of FIG. 1). In certain embodiments, the state transition 458 has the highest priority among the three possible state transition paths out of sub-state 452, as this path intends to cover any potential failure modes associated with the unexpected CIPV drop or change. Also in various embodiments, in the second priority state transition, when an adaptive cruise control auto-resume flag is deemed to have a value of "True", as set in the step 230 of FIG. 2, then the vehicle 100 is automatically moved by following the drive-away CIPV under driver selected adaptive cruise control gap setting. In various embodiments, with respect to transition or path 454, the drive away confidence level and the driver on-road attentiveness score (both described above) are used to determine when this transition or path is valid. In the third priority state transition 456, when the adaptive cruise control notification flag is deemed to have a value of "True", as set in the step 228 of FIG. 2, the driver is notified that the target vehicle has been drove away. Therefore, the driver can choose to resume movement of the vehicle 100 by providing a driver input (such as a resume switch of the adaptive cruise control input device 152 and/or accelerator pedal 154 of FIG. 1).

Accordingly, systems, methods, and vehicle are provided for control of adaptive cruise control in vehicles, and in particular control of automatic resumption of movement of the host vehicle when stopped behind a stationary target vehicle. In various embodiments, the automatic resumption of movement of the host vehicle is based on a driver on-road attentiveness score.

It will be appreciated that the systems, vehicles, methods, applications, and implementations may vary from those depicted in the Figures and described herein. For example, in various embodiments, the vehicle 100, the control system 102, and/or various components thereof, and/or other components may differ from those depicted in FIG. 1. It will similarly be appreciated that the steps of the process 200 may differ, and/or that various steps thereof may be performed simultaneously and/or in a different order, than those depicted in FIGS. 2 and 3 and/or described above. It will likewise be appreciated that the vehicle states may differ from those depicted in FIG. 4 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling adaptive cruise control functionality for a vehicle, the method comprising:
    monitoring a driver of the vehicle while the vehicle is stopped during adaptive cruise control operation while a target vehicle in front of the vehicle has stopped, using sensor data obtained by one or more sensors onboard the vehicle;
    calculating, via the processor, a driver attentiveness score based on the monitoring of the driver while the vehicle is stopped during adaptive cruise control operation while the target vehicle in front of the vehicle has stopped, wherein:
    the driver attentiveness score is calculated via the processor along a sliding window comprising a plurality of points in time while the vehicle is stopped until the target vehicle resumes movement; and
    the driver attentiveness score is weighted via the processor among the plurality of points in time using fuzzy logic, with a relatively higher weight given to those of the plurality of points in time that are closer in time to when the target vehicle resumes movement, to generate a time indexed weighted interpretation of the driver attentiveness, and wherein the time index weighted interpretation is performed separately for each of a plurality of driver attentiveness monitoring states using a machine learning process while the target vehicle has stopped and prior to the target vehicle resuming movement, generating a unique weighting for each of the plurality of driver attentiveness monitoring states while the target vehicle has stopped and prior to the target vehicle resuming movement; and
    automatically resuming movement of the vehicle, via instructions provided by a processor, when the target vehicle resumes movement, based on the monitoring of the driver of the vehicle, wherein the step of automatically resuming movement of the vehicle comprises automatically resuming movement of the vehicle, via instructions provided by the processor, when the target vehicle resumes movement, based on the calculated driver attentiveness score;
    wherein:
    the step of monitoring the driver comprises monitoring eye movement of the driver via one or more sensors until the target vehicle resumes movement; and
    the step of calculating the driver attentiveness score comprises calculating the driver attentiveness score via the processor based on the eye movement of the driver, using sensor data obtained via the one or more sensors, and specifically based on using the eye movement to determine each the plurality of driver attentiveness monitoring states, including the following:
    whether the driver is looking directly ahead of the vehicle along the road;
    whether the driver is looking elsewhere outside the vehicle;
    whether the driver is looking at center console inside the vehicle; and
    whether the eyes of the driver are closed.

2. The method of claim 1, wherein the driver attentiveness score is calculated via the processor using different values assigned for the driver attentiveness score for each of the following: whether the driver is looking directly ahead of the vehicle along the road; whether the driver is looking elsewhere outside the vehicle; whether the driver is looking at the center console inside the vehicle; and whether the eyes of the driver are closed.

3. The method of claim 1, wherein:
the step of automatically resuming movement comprises automatically resuming movement of the vehicle, via instructions provided by the processor, when the driver attentiveness score exceeds a predetermined threshold following a predetermined amount of time, as determined via the processor using a timer; and
the method further comprises:
providing a notification for the driver, via instructions provided by the processor to a notification device of the vehicle, requesting driver input to initiate resumption of movement of the vehicle, rather than automatically resuming movement of the vehicle, when the driver attentiveness score does not exceed the predetermined threshold following the predetermined amount of time.

4. A system for controlling adaptive cruise control functionality for a vehicle, the system comprising:
one or more sensors disposed onboard the vehicle and configured to obtain sensor data for monitoring a driver of the vehicle while the vehicle is stopped during adaptive cruise control operation while a target vehicle in front of the vehicle has stopped; and
a processor coupled to the one or more sensors and configured to:
calculate a driver attentiveness score based on the monitoring of the driver while the vehicle is stopped during adaptive cruise control operation while the target vehicle in front of the vehicle has stopped, wherein:
the processor calculates the driver attentiveness score along a sliding window comprising a plurality of points in time while the vehicle is stopped until the target vehicle resumes movement; and
the processor weights the driver attentiveness score among the plurality of points in time using fuzzy logic, with a relatively higher weight given to those of the plurality of points in time that are closer in time to when the target vehicle resumes movement, to generate a time indexed weighted interpretation of the driver attentiveness, and wherein the time index weighted interpretation is performed separately for each of a plurality of driver attentiveness monitoring states using a machine learning process while the target vehicle has stopped and prior to the target vehicle resuming movement, generating a unique weighting for each of the plurality of driver attentiveness monitoring states while the target vehicle has stopped and prior to the target vehicle resuming movement; and
provide instructions for automatically resuming movement of the vehicle, when the target vehicle resumes movement, based on the monitoring of the driver of the vehicle, by automatically resuming movement of the vehicle, via instructions provided by the processor, when the target vehicle resumes movement, based on the calculated driver attentiveness score;
wherein:
the one or more sensors are further configured to monitor eye movement of the driver; and the processor is further configured to calculate the driver attentiveness score based on the eye movement of the driver, including whether the driver is looking at a road in front of the vehicle, using sensor data obtained via the one or more sensors, and specifically based on using the eye movement to determine each the plurality of driver attentiveness monitoring states, including the following:
whether the driver is looking directly ahead of the vehicle along the road;
whether the driver is looking elsewhere outside the vehicle;
whether the driver is looking at a center console inside the vehicle; and
whether the eyes of the driver are closed.

5. The system of claim 4, wherein the processor is further configured to calculate the driver attentiveness score using different values assigned for the driver attentiveness score for each of the following: whether the driver is looking directly ahead of the vehicle along the road; whether the driver is looking elsewhere outside the vehicle; whether the driver is looking at the center console inside the vehicle; and whether the eyes of the driver are closed.

6. The system of claim 4, wherein the processor is further configured to:
provide instructions for automatically resuming movement of the vehicle when the driver attentiveness score exceeds a predetermined threshold following a predetermined amount of time, as determined via the processor using a timer; and
provide instructions for a notification device of the vehicle to provide a notification for the driver requesting driver input to initiate resumption of movement of the vehicle, rather than automatically resuming movement of the vehicle, when the driver attentiveness score does not exceed the predetermined threshold following the predetermined amount of time.

7. A vehicle comprising:
a body;
a drive system disposed within the body and having adaptive cruise control functionality; and
a control system for controlling the adaptive cruise control functionality for the vehicle, the control system comprising:
one or more sensors disposed onboard the vehicle and configured to obtain sensor data for monitoring a driver of the vehicle while the vehicle is stopped during adaptive cruise control operation while a target vehicle in front of the vehicle has stopped; and
a processor coupled to the one or more sensors and configured to:
calculate a driver attentiveness score based on the monitoring of the driver while the vehicle is stopped during adaptive cruise control operation while the target vehicle in front of the vehicle has stopped, wherein:
the processor calculates the driver attentiveness score along a sliding window comprising a plurality of points in time while the vehicle is stopped until the target vehicle resumes movement; and the processor weights the driver attentiveness score among the plurality of points in time using fuzzy logic, with a relatively higher weight given to those of the plurality of points in time that are closer in time to when the target vehicle resumes movement, to generate a time indexed weighted interpretation of the driver attentiveness, and wherein the time index weighted interpretation is performed separately for each of a plurality of driver attentiveness monitoring states using a machine learning process while the target vehicle has stopped and prior to the target vehicle resuming movement, generating a unique weighting for each of the plurality of driver attentiveness monitoring states while the target vehicle has stopped and prior to the target vehicle resuming movement; and provide instructions for automatically resuming movement of the vehicle, when the target vehicle resumes movement, based on the monitoring of the driver of the vehicle, by automatically resuming movement of the vehicle, via instructions provided by the processor, when the target vehicle resumes movement, based on the calculated driver attentiveness score;

wherein:

the one or more sensors are further configured to monitor eye movement of the driver; and the processor is further configured to calculate the driver attentiveness score based on the eye movement of the driver, using sensor data obtained via the one or more sensors, and specifically based on using the eye movement to determine each the plurality of driver attentiveness monitoring states, including the following:

whether the driver is looking directly ahead of the vehicle along the road;

whether the driver is looking elsewhere outside the vehicle;

whether the driver is looking at a center console inside the vehicle; and whether the eyes of the driver are closed.

8. The vehicle of claim 7, wherein the processor is further configured to calculate the driver attentiveness score using different values assigned for the driver attentiveness score for each of the following: whether the driver is looking directly ahead of the vehicle along the road; whether the driver is looking elsewhere outside the vehicle; whether the driver is looking at the center console inside the vehicle; and whether the eyes of the driver are closed.

9. The vehicle of claim 7, wherein the processor is further configured to:

provide instructions for automatically resuming movement of the vehicle when the driver attentiveness score exceeds a predetermined threshold following a predetermined amount of time, as determined via the processor using a timer; and provide instructions for a notification device of the vehicle to provide a notification for the driver requesting driver input to initiate resumption of movement of the vehicle, rather than automatically resuming movement of the vehicle, when the driver attentiveness score does not exceed the predetermined threshold following the predetermined amount of time.

* * * * *